United States Patent [19]

Kleinschmidt et al.

[11] 4,185,475
[45] Jan. 29, 1980

[54] UNIVERSAL JOINT ASSEMBLY

[75] Inventors: Hans-Joachim Kleinschmidt; Gerd Faulbecker, both of Essen, Fed. Rep. of Germany

[73] Assignee: Gelenkwellenbau GmbH, Essen, Fed. Rep. of Germany

[21] Appl. No.: 893,526

[22] Filed: Apr. 4, 1978

[30] Foreign Application Priority Data

Apr. 7, 1977 [DE] Fed. Rep. of Germany ....... 2715616

[51] Int. Cl.² .............................................. F16D 3/30
[52] U.S. Cl. ............................................ 64/21; 64/4;
403/374; 403/313; 403/344; 403/342
[58] Field of Search ...................... 64/21, 4; 285/343;
403/313, 374, 344, 342

[56] References Cited

U.S. PATENT DOCUMENTS

| | | | |
|---|---|---|---|
| 1,131,399 | 3/1915 | McGinly | 285/343 |
| 2,179,200 | 11/1939 | Scholtes | 285/343 |
| 2,531,730 | 1/1950 | Henderson | 285/343 |
| 2,588,827 | 3/1952 | Gouch | 285/343 |
| 2,839,905 | 6/1958 | Trbojevich | 64/21 |
| 3,045,456 | 7/1962 | Bellomo | 64/21 |
| 4,027,927 | 6/1977 | Turner | 64/21 |

*Primary Examiner*—Charles J. Myhre
*Assistant Examiner*—R. C. Turner
*Attorney, Agent, or Firm*—Toren, McGeady and Stanger

[57] ABSTRACT

A universal joint assembly having an inner and an outer joint member with torque transmitting means therebetween is formed with a drive shaft attached to the inner joint member within an axially slotted bevelled end portion formed on an extension of the inner joint member. The inner member has threaded means formed on a cylindrical outer wall thereof and by threaded engagement of a nut about the end of the inner member extension, the drive shaft is releasably engaged and clamped in the inner joint member in a manner facilitating this assembly. The outer wall of the inner joint member is also formed with a recess within which one side of a sealing boot may be secured.

2 Claims, 3 Drawing Figures

UNIVERSAL JOINT ASSEMBLY

BACKGROUND OF THE INVENTION

The present invention relates generally to torque transmitting devices and more particularly to a universal joint having generally axially aligned shafts. The invention is particularly related to the type of universal joint which includes an outer joint member, an inner joint member and torque transmitting elements received within grooves provided in each of the inner and outer joint members. In devices of the type to which the present invention relates a cage is provided where appropriate in order to maintain the torque transmitting elements in place within the respective grooves of the inner and outer joint members and the joint of the invention is further related to assemblies of the type wherein a splined drive shaft is attached in rotatively fixed engagement within the inner joint member.

In prior art universal joints, for example the joint described in German PS No. 1,914,275, a precise relative fixation between the drive shaft and the inner joint member is accomplished by means of a groove formed in the drive shaft and by a circlip engaged in this groove. This arrangement has the drawback that the drive shaft can be removed only if the outer joint member is of a two-part or split configuration in order to permit access to the circlip for the purposes of its removal with the aid of a suitable tool. Where such a split configuration is not possible the entire joint assembly must be completely stripped down whereupon the drive shaft and the inner joint member may be removed as a unit.

In other prior universal joint assemblies, such as for example that described in German PS No. 2,044,724, the outer joint member is formed to be either integral with the drive shaft or is at least arranged to be nondetachably secured thereto. In such arrangements, in order to permit the axle journal or shaft to be removed, the inner joint member is secured upon such a shaft by means of a spring ring. This elastic securing device is capable of taking up a given axial thrust so that it is possible to remove the axial journal or shaft by a removal process involving the utilization of a particular tool. However, such an operation depends largely upon prevailing fitting conditions and in many cases there is insufficient space for performance of this operation.

The present invention is directed toward an improvement in universal joint assemblies wherein the inner joint member of the universal joint assembly may be secured upon the drive shaft in a manner facilitating relatively simple and easy securing engagement thereof even under confined space conditions while at the same time maintaining a satisfactory fixed engagement between their parts in the axial direction of the universal joint.

SUMMARY OF THE INVENTION

Briefly, the present invention may be described as a universal joint assembly comprising an inner joint member and an outer joint member having torque transmitting elements interposed therebetween with grooves arranged in both the inner and outer joint members for holding in operative position therein the torque transmitting elements. The joint assembly is of the type wherein the inner joint member and the outer joint member are axially slideable relative to each other. Where appropriate, cage means for supporting the torque transmitting means in operative position within the grooves may be provided. The assembly includes a drive shaft attached in rotatively fixed engagement with the inner joint member by splined means interposed between the shaft and the inner joint member. The inner joint member includes a hollow extension member formed on the side thereof outwardly of the joint assembly, with the extension member having an internal diameter which is substantially equivalent to the outside diameter of the drive shaft. An axially slotted bevelled end portion is formed on the extension member and a cylindrical outer circumferential wall of the extension member has screw threads formed thereon. Nut means are threadedly engaged about the cylindrical outer circumferential wall of the extension member, with the nut means being formed to include an internally bevelled wall adapted to mate with the axially slotted bevelled end portion of the extension member in order thereby to clamp the drive shaft within the inner joint member by tightening of the nut means about the extension member.

By a further aspect of the invention, the outside surface of the extension member may be formed with a receiving groove within which there may be secured part of a sealing boot of the assembly.

An advantage of the structural arrangement of the present invention resides in the fact that the inner joint member is secured upon the drive shaft by means which are located externally of the actual joint interior and which are, therefore, accessible at all times from outside of the assembly. In some applications of the invention, fitting conditions exist wherein it is not possible to press or squeeze the drive shaft out of position for stripping purposes owing to an axial restriction which may, for example, be created by a gear box and differential in the case of longitudinal drive shafts of motor vehicles. In such cases, the application of the present invention will give rise to considerable advantages inasmuch as removal of a shaft may be greatly facilitated and performed with relative ease after loosening the nut means of the invention and axially sliding the entire unit as required. As a result, there is eliminated the need for dismantling of the actual joint itself.

A further advantage, applicable particularly in cases where two joints associated with a connecting shaft are involved, resides in the fact that the entire transmission may be centered by the two inner joint members inasmuch as no counter measures will be required for fixing the inner joint members on the shaft.

According to a further feature of the invention, intended to provide for a precise and reliable seal for the interior of the joint assembly, the outer wall of the extension member of the inner joint member is formed to comprise a receiving groove for enabling part of a sealing boot to be secured therein.

Utilization of the extension portion or member of the invention for the purpose of securing the sealing means operates to prevent escape of lubricant even when the shaft is disconnected from the inner joint member which has no passage bore or sealing cap. The joint as such remains a sealed unit.

The various features of novelty which characterize the invention are pointed out with particularity in the claims annexed to and forming a part of this disclosure. For a better understanding of the invention, its operating advantages and specific objects attained by its use, reference should be had to the accompanying drawings

DETAILED DESCRIPTION OF THE PREFERRED EMBODIMENT

Figure 1:
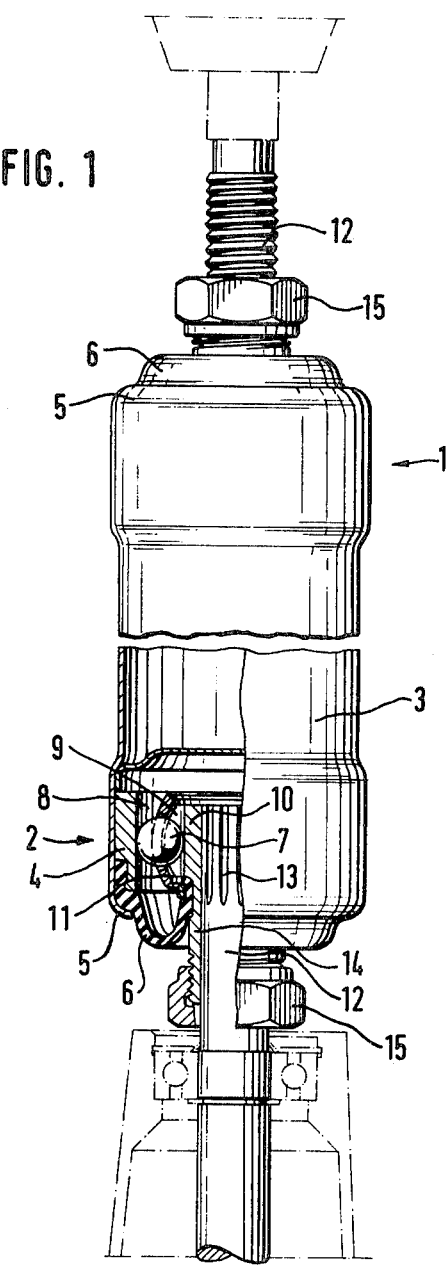
FIG. 1 is a view partially in section of a universal joint assembly in accordance with the present invention with a drive shaft shown in the fitted position.

Referring now to the drawings, wherein like reference numerals are used to refer to similar parts throughout the various figures thereof, the present invention is shown as embodied as part of a transmission shaft 1 having its ends connected, respectively, to a drive unit and to a differential gear or gear box unit which are only diagramatically indicated for simplified representation. The transmission shaft 1 includes a universal joint assembly which is essentially composed of two universal joints 2 interconnected by a tube 3. The tube 3 is connected with an outer joint member 4 of each of the joints 2 and is adapted at its ends 5 to have secured thereto a concertina or sealing boot 6.

Each of the joints 2 comprises torque transmitting elements in the form of balls 7 which operate to transmit driving torque between an outer joint member 4 and an inner joint member 10 of the joint assembly 2. Each of the balls 7 is received in a groove 8 of the outer joint member 4 and also in a groove 9 of the inner joint member 10. Additionally, the balls 7 are supported in the apertures of a cage 11 which is arranged between the inner joint member 10 and the outer joint member 4.

The joints depicted are sliding joints; that is, the inner joint member 10 of each joint is slideable relative to the outer joint member 4 thereof. The inner joint member 10 comprises a bore wherein a shaft 12 is engaged in rotatively fixed relationship relative to the inner joint member 10 by a splined connection 13. In order to prevent axial dislocation between the shaft 12 and the inner joint member 10, the inner joint member is provided at one end thereof toward the outer side of the joint 2 with an extension part or member 14 whereby the member 10 may be secured upon the shaft 12 by means of a nut 15.

Figure 2:
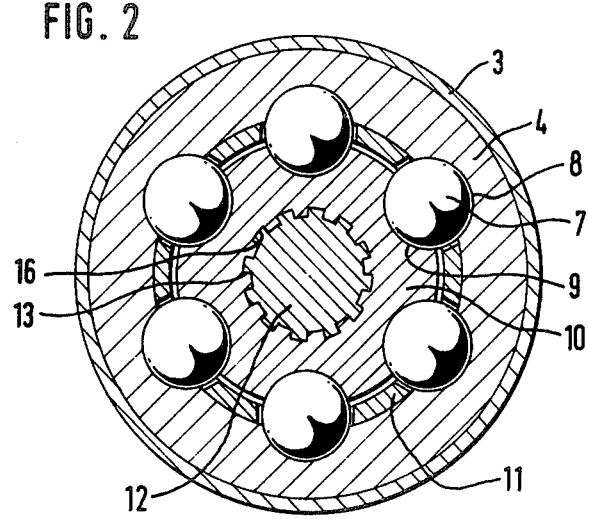
FIG. 2 is a sectional view taken through a joint of the assembly of FIG. 1.

FIG. 2 is a cross sectional view of one of the joints 2 depicted in FIG. 1 and as will appear therein, the outer joint member 4 is accommodated within the intermediate connecting tube 3 and the balls 7 are received in grooves 8 formed in the outer joint member 4 and in grooves 9 formed in the inner joint member 10. Additionally, the balls 7 are guided by the cage 11. The shaft 12 is in rotationally fixed engagement in the bore of the inner joint member 10, with such rotationally rigid or fixed engagement being effected by the splined means 13.

Figure 3:
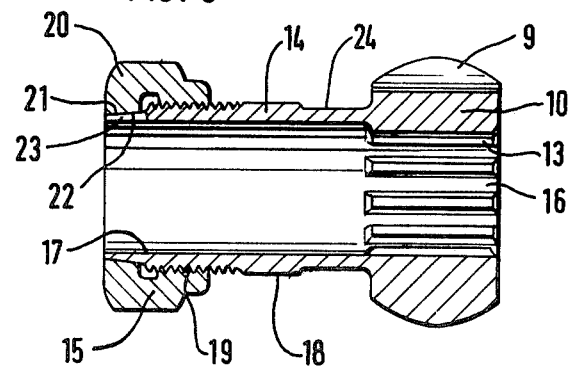
FIG. 3 is a sectional view of an inner joint member of the assembly shown in FIGS. 1 and 2.

In FIG. 3 there is shown the inner joint member 10 which comprises grooves 9 formed in its exterior wall for accommodating the balls 7. The splines 13 are formed within a bore 16 and one end of the inner joint member 10 is formed with the extension member 14 having a bore 17 which is dimensioned with an inner diameter generally equivalent to the outer diameter of the drive shaft 12 to be connected therein.

The extension member 14 is formed with an outer wall 18 which is provided with screw threads adapted to be threadedly engaged by a nut 15. An end 20 of the nut 15 opposite the thread 19 includes a bore having a bevelled face 21 which co-acts with a mating bevelled end 22 of the extension member 14.

Thus, when the nut 15 is turned in threaded engagement with the threads 19 about the extension member 14, the bevelled face 21 will move in engagement with the bevelled end 22 and will tend to press or clamp the inner wall of the inner joint member 10 about the drive shaft 12.

In order to insure precise and more effective clamping action when the nut 15 is tightened, the bevelled end 22 of the extension member 14 is axially split or slotted by a slot 23 formed therein.

The extension member 14 is further provided with an annular receiving groove 24 which, as best seen in FIG. 1, operates to have engaged and secured therein one side of the sealing boot 6 which prevents deleterious material from entering the joints 2.

While a specific embodiment of the invention has been shown and described in detail to illustrate the application of the inventive principles, it will be understood that the invention may be embodied otherwise without departing from such principles.

What is claimed is:

1. A universal joint assembly comprising: an inner joint member; an outer joint member; said inner joint member and said outer joint member being arranged to be slideably movable relative to each other in the axial direction of said joint assembly; torque transmitting elements interposed between said inner and outer joint members; grooves arranged in both said inner and outer joint members for holding in operative position therein said torque transmitting elements; cage means for supporting said torque transmitting elements in operative position within said grooves; a drive shaft; splined means interposed between said inner joint member and said drive shaft connecting said inner joint member with said drive shaft in rotatably fixed engagement while permitting axial movement therebetween; a hollow extension member formed on said inner joint member on the side thereof outwardly of said joint assembly, said extension member having an internal diameter portion substantially equivalent to the outside diameter of said drive shaft, said internal diameter portion being arranged on said inner member on the side of said splined means axially outwardly of said joint assembly; an axially slotted bevelled end portion formed on said extension member; a cylindrical outer circumferential wall on said extension member having screw threads formed thereon; and nut means adapted to be threadedly engaged about said cylindrical outer circumferential wall, said nut means including an internally bevelled wall adapted to engage with said axially slotted bevelled end portion of said extension member to clamp said drive shaft with said internal diameter portion of said inner joint member by tightening of said nut means about said extension member.

2. A universal joint assembly according to claim 1 wherein said extension member includes a receiving groove formed on a portion of said outer circumferential wall on a side of said screw thread axially inwardly of said joint assembly, said assembly further including sealing boot means affixed in sealed engagement between said receiving groove and said outer joint member.

* * * * *